(12) United States Patent
Ruckel et al.

(10) Patent No.: US 10,701,898 B2
(45) Date of Patent: Jul. 7, 2020

(54) MULTI-FUNCTIONAL RECONFIGURABLE PET ENRICHMENT SYSTEM

(71) Applicants: Frederick W. Ruckel, Gilboa, NY (US); Natasha Ruckel, Gilboa, NY (US)

(72) Inventors: Frederick W. Ruckel, Gilboa, NY (US); Natasha Ruckel, Gilboa, NY (US)

( * ) Notice: Subject to any disclaimer, the term of this patent is extended or adjusted under 35 U.S.C. 154(b) by 0 days.

(21) Appl. No.: 16/367,810

(22) Filed: Mar. 28, 2019

(65) Prior Publication Data

US 2019/0223410 A1 Jul. 25, 2019

Related U.S. Application Data

(63) Continuation of application No. 16/003,702, filed on Jun. 8, 2018, now abandoned, which is a continuation of application No. 15/083,794, filed on Mar. 29, 2016, now Pat. No. 10,070,623.

(60) Provisional application No. 62/141,369, filed on Apr. 1, 2015.

(51) Int. Cl.
*A01K 15/02* (2006.01)
*A01K 1/03* (2006.01)

(52) U.S. Cl.
CPC ............ *A01K 15/025* (2013.01); *A01K 1/033* (2013.01); *A01K 15/02* (2013.01)

(58) Field of Classification Search
CPC .... A01K 1/0353; A01K 15/02; A01K 15/024; A01K 15/025; A01K 15/027
USPC .......................... 119/28.5, 702, 703, 707, 711
See application file for complete search history.

(56) References Cited

U.S. PATENT DOCUMENTS

| | | | |
|---|---|---|---|
| 2,032,248 | A | 3/1935 | Bins |
| 2,540,309 | A | 2/1951 | Winsor |
| 3,316,669 | A | 5/1967 | Nachbar |
| 3,486,485 | A | 12/1969 | Kahanick |
| 3,934,552 | A | 1/1976 | Kulka |

(Continued)

FOREIGN PATENT DOCUMENTS

WO 2015106763 A1 7/2015

OTHER PUBLICATIONS

Burgess, Marc R., U.S. Appl. No. 15/083,794, Office Action dated Jun. 21, 2017, 19 pgs.

(Continued)

*Primary Examiner* — Marc Burgess
(74) *Attorney, Agent, or Firm* — Madeline F. Schiesser; Keohane & D'Alessandro, PLLC (57) ABSTRACT

A method of using a reconfigurable pet enrichment system to help pets fulfill their natural behaviors is provided. The system can be arranged to facilitate an environment that helps stimulate, entertain, and exercise a pet, and also provides a defensible space for napping, resting, or sleeping. The system can be constructed from two pieces of pliable material: a base component and a top-covering component attached to the base component by means of semi-permanent fasteners to create a variety of forms such as ripples, nooks and tunnels. The top component can contain several openings of different sizes. Openings appeal to a pet's predatory nature, as the openings provide a source of stimulation and interaction. The system may also be configured with a plurality of members attached via semi-permanent fasteners.

20 Claims, 11 Drawing Sheets

(56) References Cited

U.S. PATENT DOCUMENTS

| | | | |
|---|---|---|---|
| 3,989,008 A | 11/1976 | Neumann | |
| 4,122,628 A | 10/1978 | Crowell et al. | |
| 4,147,129 A | 4/1979 | Ruplen | |
| 4,327,668 A | 5/1982 | Phillips | |
| 4,576,116 A * | 3/1986 | Binkert | A01K 1/033 |
| | | | 119/498 |
| 4,609,356 A | 9/1986 | Gilden et al. | |
| 4,631,765 A | 12/1986 | Casey | |
| 4,808,139 A | 2/1989 | Price | |
| 4,979,924 A | 12/1990 | Manger | |
| 5,010,843 A | 4/1991 | Henry | |
| 5,078,096 A * | 1/1992 | Bishop | A01K 1/0254 |
| | | | 119/497 |
| 5,188,059 A | 2/1993 | Rice | |
| 5,247,902 A * | 9/1993 | Williams | A01K 15/024 |
| | | | 119/706 |
| D344,613 S | 2/1994 | Cromwell | |
| 5,813,366 A | 9/1998 | Mauldin, Jr. | |
| 6,010,387 A | 1/2000 | Nemec et al. | |
| 6,076,486 A | 6/2000 | Okiano | |
| 6,280,283 B1 | 8/2001 | Sisler | |
| D454,236 S | 3/2002 | Kaplan | |
| 6,378,456 B1 | 4/2002 | Jerome | |
| 6,557,494 B2 | 5/2003 | Pontes | |
| 7,555,997 B2 | 7/2009 | Wolfe, Jr. et al. | |
| 7,600,486 B2 * | 10/2009 | Ellis | A01K 7/005 |
| | | | 119/61.5 |
| 7,621,235 B2 | 11/2009 | Genitrini | |
| D632,025 S * | 2/2011 | Cole | D30/118 |
| 8,020,521 B2 | 9/2011 | Krotts et al. | |
| 8,065,977 B1 | 11/2011 | Wilks | |
| D652,180 S | 1/2012 | Haaf | |
| 8,584,620 B2 | 11/2013 | Rutherford et al. | |
| 8,936,502 B2 | 1/2015 | King et al. | |
| 9,282,834 B2 | 3/2016 | Lacasse | |
| 9,924,697 B1 | 3/2018 | Koskey, Jr. | |
| 10,070,623 B2 * | 9/2018 | Ruckel | A01K 15/025 |
| 2005/0031829 A1 | 2/2005 | Crenshaw et al. | |
| 2005/0136214 A1 | 6/2005 | Most | |
| 2005/0136390 A1 | 6/2005 | Galbraith Coates | |
| 2006/0272581 A1 | 12/2006 | Dunn et al. | |
| 2007/0062456 A1 | 3/2007 | Pace | |
| 2007/0074667 A1 | 4/2007 | Quinn | |
| 2007/0193522 A1 | 8/2007 | Greschler | |
| 2007/0215062 A1 | 9/2007 | Cummings | |
| 2009/0325133 A1 | 12/2009 | Guill | |
| 2010/0019451 A1 | 1/2010 | Kucharski | |
| 2010/0199921 A1 | 8/2010 | Haaf et al. | |
| 2012/0096642 A1 | 4/2012 | Hickman | |
| 2012/0192802 A1 | 8/2012 | Haaf | |
| 2013/0067660 A1 | 3/2013 | Sloan | |
| 2013/0284099 A1 | 10/2013 | Oakes, Jr. | |
| 2013/0318712 A1 | 12/2013 | Cordoves et al. | |
| 2014/0190417 A1 | 7/2014 | Lipscomb et al. | |
| 2016/0286761 A1 | 10/2016 | Ruckel et al. | |
| 2016/0330935 A1 | 11/2016 | Vesterholt | |
| 2018/0288972 A1 | 10/2018 | Ruckel | |

OTHER PUBLICATIONS

Burgess, Marc R., U.S. Appl. No. 15/083,794, Final Office Action dated Aug. 30, 2017, 14 pgs.

"Felt Pictures and Miscellany" from ikatbag.com, Feb. 24, 2009, http://www.ikatbag.com/2009/02/felt-pictures-and-miscellany.html.

"How to Make a Felt Board for the Crafty Challenged" from House of Peanut, May 4, 2012, http://houseofpeanut.blogspot.com/2012/5/how-to-make-felt-board-for-crafty.html.

Burgess, Marc R., U.S. Appl. No. 15/083,794, Office Action dated Apr. 6, 2018, 18 pgs.

Burgess, Marc R., U.S. Appl. No. 15/083,794, Notice of Allowance dated Aug. 6, 2018, 8 pgs.

Burgess, Marc R., U.S. Appl. No. 16/003,702, Office Action dated Aug. 23, 2018, 33 pgs.

Burgess, Marc R., U.S. Appl. No. 16/367,799, Notice of Allowance dated May 8, 2019, 17 pgs.

* cited by examiner

MULTI-FUNCTIONAL RECONFIGURABLE PET ENRICHMENT SYSTEM

CROSS-REFERENCE TO RELATED U.S. APPLICATIONS

The present patent document is a continuation of, and claims the benefit of, co-pending and co-owned U.S. patent application Ser. No. 16/003,702 filed Jun. 8, 2018 and titled "Multi-Functional Reconfigurable Pet Enrichment System," which itself claims priority to U.S. patent application Ser. No. 15/083,794 filed Mar. 29, 2016 and titled "Multi-Functional Reconfigurable Pet Enrichment System," which itself claims priority to U.S. provisional patent application Ser. No. 62/141,369, filed Apr. 1, 2015, and titled "Ripple Rug," the disclosures of which are incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to a reconfigurable pet enrichment system designed to accommodate a domestic cat or other pets. The system of the present invention is characterized by the system's ability to be reshaped, reconfigured, and altered in form, thereby serving a plurality of different functions, retaining pet interest through continued variation, and helping to prevent potentially destructive behaviors.

BACKGROUND OF THE INVENTION

The current pet market provides a range of activity mats, scratching objects, beds, and toys that fulfill different needs; however, many fail (i) to address multiple functions in one toy or (ii) to succeed in continuing to peak a pet's interest through new configurations, long after the initial introduction.

Pet owners must seek creative ways in which to find compelling solutions to keep their pets from becoming bored or exhibiting compulsive behaviors.

For example, felines and other similar sized animals require stimulation, exercise, entertainment, a predatory play space, an environment allowing positive human interaction, and a secure, safe space in which to rest and recover.

Due to the inquisitive nature and genetically programmed instinct for survival, cats, in particular, become disillusioned with toys and play areas once familiar, often abandoning them once their curiosity has been satisfied or their prey toy has been conquered.

A single toy that encompasses an ever-changing environment, which satisfies the need to hunt and interact, and which provides safety, comfort, and continued interest through change, can greatly benefit both pet and owner.

Several attempts have been made in the art to provide play environments for cats, including the following.

U.S. Pat. No. 5,188,059 discloses an apparatus "constructed from a box with open top having fabric stretched across the top and having holes cut in the corners and with a flap in the middle." The holes "are large enough for a cat's paws and shoulders" and a cat can reach "inside to grab for a ball placed inside the box".

U.S. Pat. No. 6,557,494 discloses an animal "toy having a first flexible sheet having a first outer periphery; a second flexible sheet having a second outer periphery; and connectors for joining at least three portions of the first and second sheets" where "the connectors form[ ] a cavity between the first flexible sheet and the second flexible sheet" and openings "sized to permit passage of a favorite object".

U.S. Pat. No. 8,020,521 discloses a play apparatus having "a retainer for an animal attractant, such as catnip" where the "retainer may be opened to allow for the introduction and removal of the attractant" and an "overlay partially cover[ing] the retainer to restrict direct access by the animal to the attractant".

WIPO Patent Application Publication 2015/106,763 discloses "a pet activity toy comprising a flexible sheet-like mat with an upper surface (S) and a first connector element on said upper surface (S), and one or more pouches, . . . each of said one or more pouches having one or more second connector elements configured for being releasably connectable and reconnectable with said first connector elements".

SUMMARY OF THE INVENTION

A reconfigurable pet enrichment system designed to help pets fulfill their natural behaviors is provided herein. The system is constructed from two separate pieces of pliable material. A base component is fashioned with a non-slip element. A top-covering component is attached to the base component, by means of semi-permanent fasteners, to create a variety of forms such as ripples, nooks, and tunnels. The top component contains a plurality of differing sized openings. Openings appeal to the pet's predatory nature, as the openings provide a source of stimulation and interaction. The pet enrichment system may be formed of any desired material, so as to be safe for pet interaction. The system may also be configured with a plurality of members attached via semi-permanent fasteners, if desired.

A purpose of the pet enrichment system, which is subsequently described in greater detail, is to provide pets with an environment, that not only helps stimulate, entertain, exercise, and continually challenge pets, but also provides a defensible space for napping, resting, or sleeping.

One aspect of the invention includes a pet enrichment system constructed from two separate pieces of pliable material: (a) a Base Component, and (b) a Top-Covering Component. The top covering comprises a set of openings and a set of expansion mechanisms. The top covering component is attached to the base to build a pet enrichment system. The two pieces are joined using semi-permanent fasteners. When top and base are attached together, a variety of different forms can be created. Unique and continuously changeable arrangements such as ripples, nooks, and tunnels encourage a plurality of activities such as sleeping, grooming, hunting, hiding, or scratching.

The top covering of the pet enrichment system may optionally further comprise a pliable material that is reshapable when attached to the base. The top covering and the base may optionally both comprise a pliable material. The pliable material may further optionally be carpet. The pliable material may further not break and not substantially deform when folded.

The base of the pet enrichment system may optionally further comprise non-slip element or mechanism to prevent the system from sliding. The non-slip element or mechanism may optionally be rubber.

The top covering of the pet enrichment system may optionally further contain a plurality of differing-sized cut-out openings. In an aspect, smaller openings allow for pets to peer out or stick their paw through, while larger openings are big enough for an average-sized domestic cat to traverse. Openings and gaps appeal to a cat or other pet's predatory nature, as the opening and gaps provide a source of stimulation and interaction, while also amusing pet owners. A subset of the plurality of cutout openings may comprise radial cuts extending from the subset of cut-out openings.

The pet enrichment system may optionally further comprise a scented substance, applicable to a pet, applied to the pliable base and top covering.

The pet enrichment system may optionally further comprise additional 'semi-attached' members added using a semi-permanent fastener.

The pet enrichment system may optionally vary in sizes, colors, or shapes of top and bottom pieces.

The pet enrichment system may optionally further comprise more than one base component or more than one top covering.

The top covering of the pet enrichment system may optionally further be used in conjunction with existing pet and human furniture. This creates renewed interest in previously abandoned pet toys and furniture.

The pet enrichment system may optionally further comprise between 5 and 20 semi-permanent fasteners and between 5 and 25 cut-out openings.

Another aspect of the invention includes a method of providing a pet enrichment system, the method comprising: pressing a set of semi-permanent fasteners attached to a top covering of the pet enrichment system onto a base of the pet enrichment system; shaping the top covering into a configuration; and permitting an animal to interact with the top covering and base.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION OF THE INVENTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, the same elements in different figures may be assigned the same element numbers. It will be further understood that the terms "comprises" and/or "comprising", or "includes" and/or "including", when used in this specification, specify the presence of stated features, regions, steps, operations, elements, and/or components, but do not preclude the presence or addition of one or more other features, regions, steps, operations, elements, components, and/or groups thereof.

As stated above, embodiments described herein provide a reconfigurable pet enrichment system designed to help pets fulfill their natural behaviors. The system is arranged to facilitate an environment, which not only helps stimulate, entertain and exercise a pet, but also provides a defensible space for napping, resting, or sleeping. The system is constructed from two separate pieces of pliable material. The base component is fashioned with a non-slip element. The top-covering component is attached to the base component, by means of semi-permanent fasteners, to create a variety of forms such as ripples, nooks and tunnels. The top component contains a plurality of differing sized openings. Openings appeal to the pet's predatory nature, as they provide a source of stimulation and interaction. The pet enrichment system may be formed of any desired material, as described, so as to be safe for pet interaction. The system may also be configured with a plurality of members attached via semi-permanent fasteners, if desired.

Figure 1:
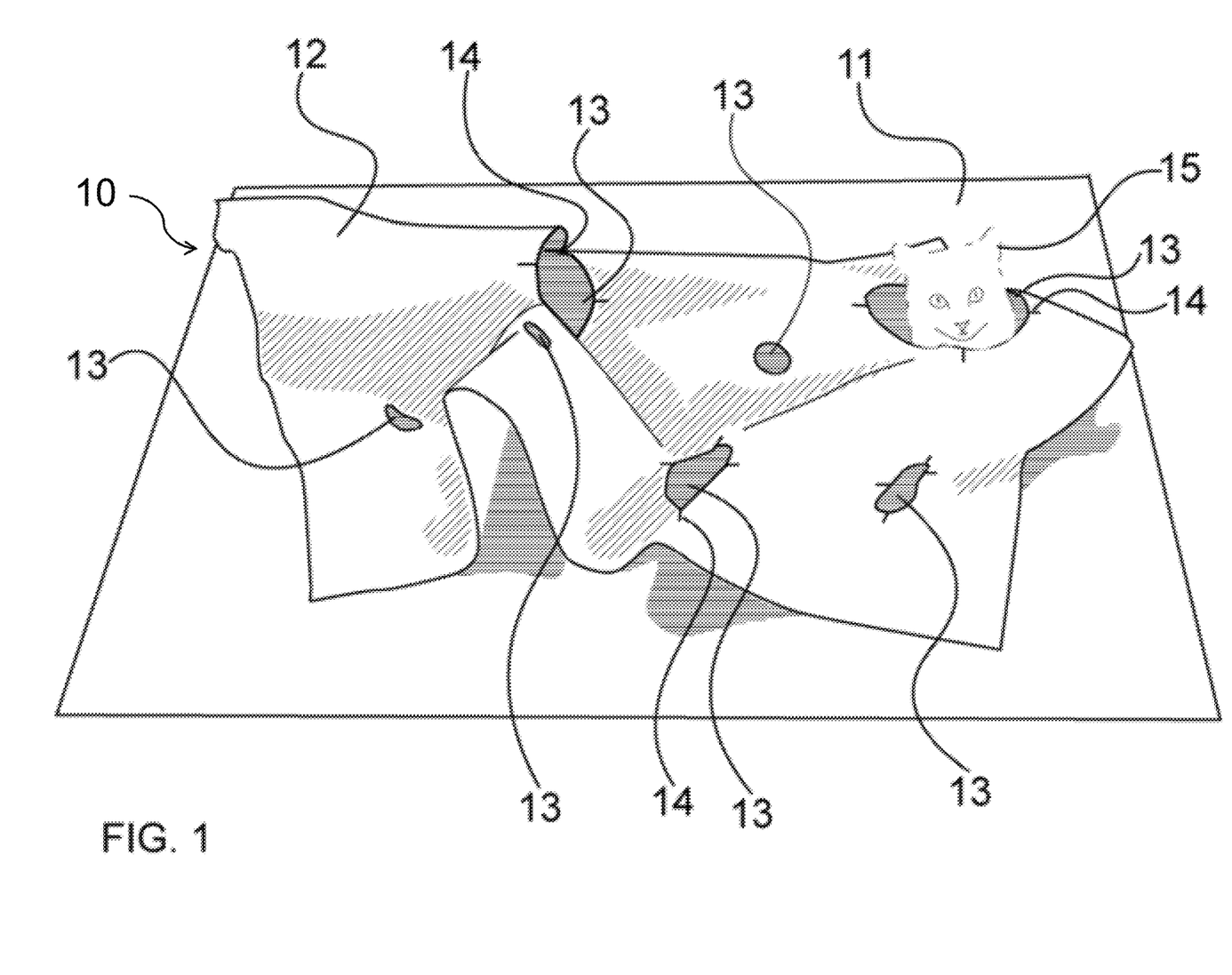
FIG. 1 is a side perspective view of an embodiment of the present invention in use.
Figure 2:
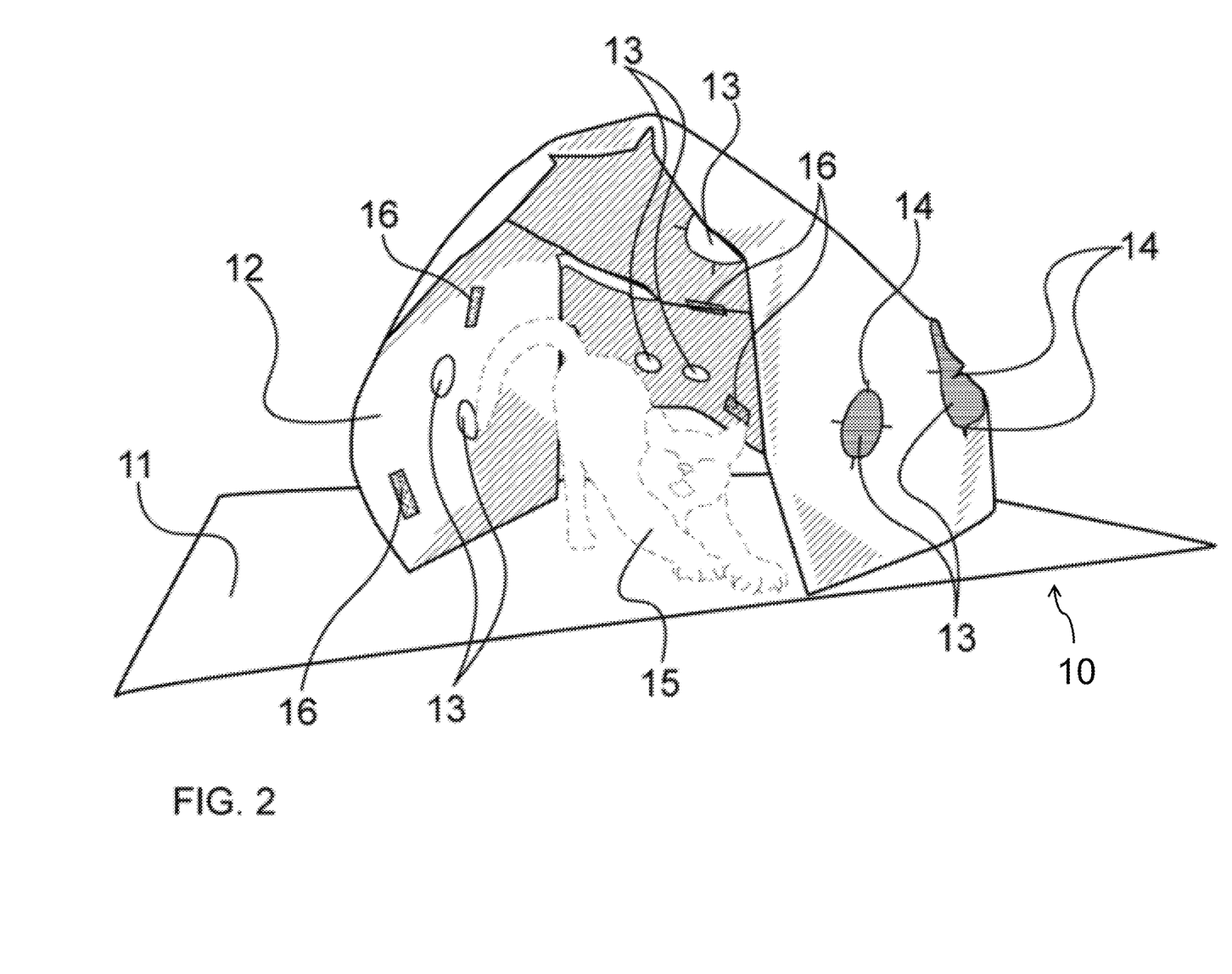
FIG. 2 is a side perspective view of an embodiment of the present invention, set up to demonstrate an alternate configuration.
Figure 3:
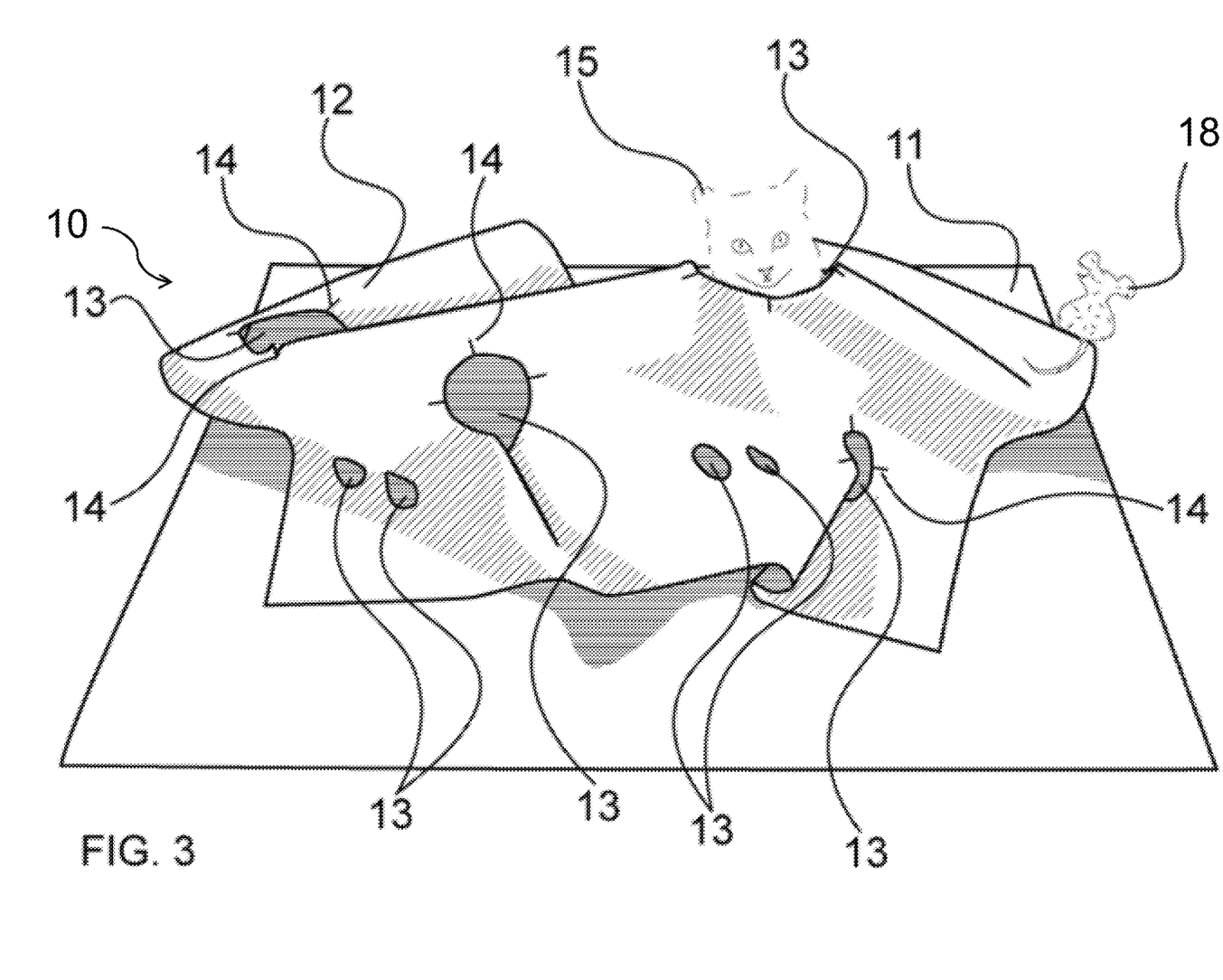
FIG. 3 represents a side perspective view of an embodiment of the present invention, demonstrating an alternate configuration in use, where an optional semi-permanent member is added.
Figure 4:
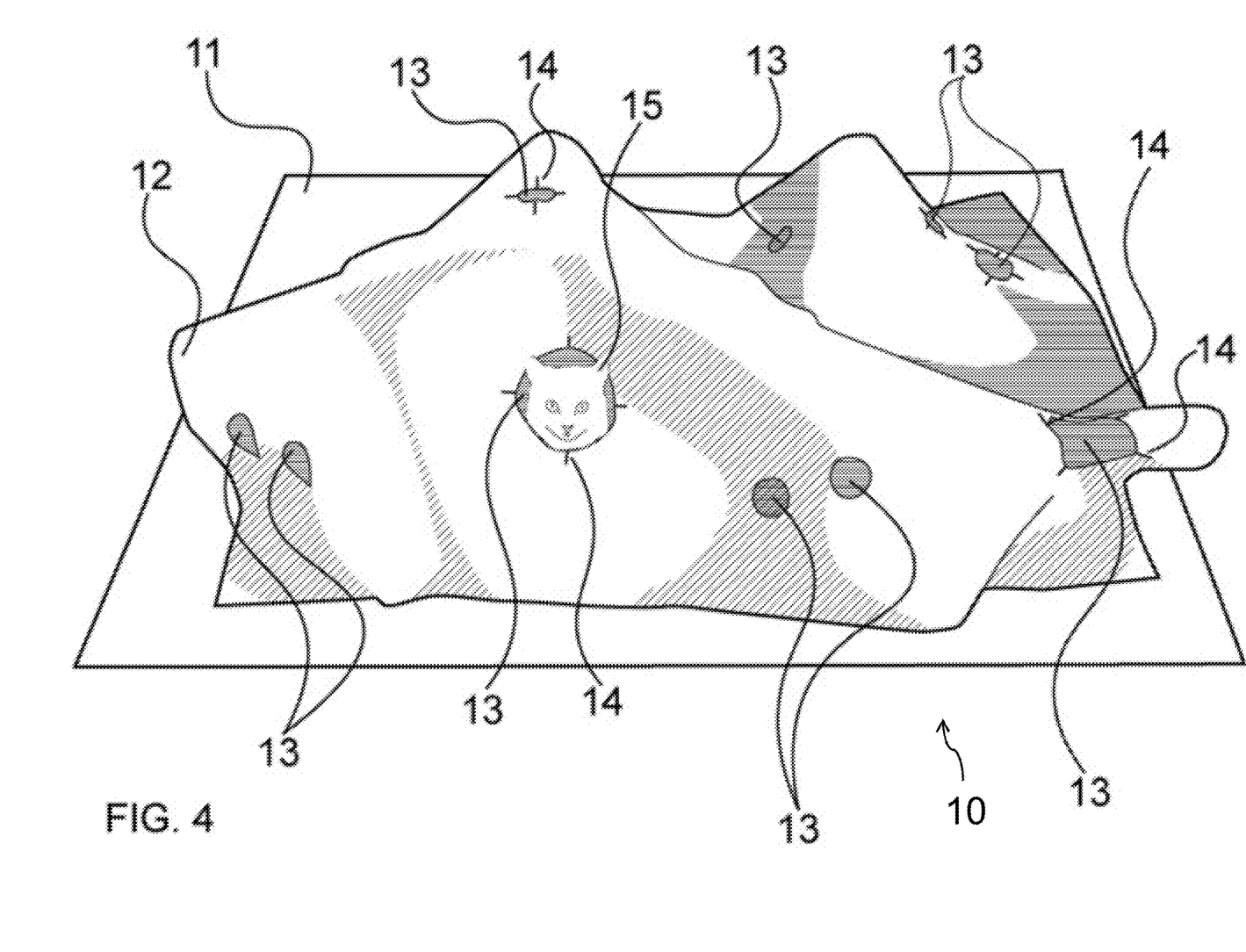
FIG. 4 represents a side perspective view of another embodiment of the pet enrichment system of the present invention in use.

Referring now to FIGS. 1, 2, 3, and 4, an embodiment of the reconfigurable pet enrichment system 10 is illustrated. FIG. 1 shows a perspective side view, FIG. 2 shows an alternative side perspective view utilizing a different configuration, FIG. 3 shows a third perspective side view showing an alternate configuration, and FIG. 4 shows a fourth perspective side view demonstrating another configuration.

As shown, the embodiment of the reconfigurable pet enrichment system 10 of the present invention comprises a base 11 and a separate top covering 12. In one embodiment, both the base 11 and top covering 12 are comprised of a pliable textile material, such as a needle-punch polyester carpet. However, both the base and top can comprise any other material that can be easily folded without breaking or fracturing, such as, but not limited to, polyethylene, polypropylene, polyester, vinyl, nylon, rubber, leather, cotton, wool, various fibrous materials, various plasticized materials, cardboard, paper, carpets, etc.

Figure 5:
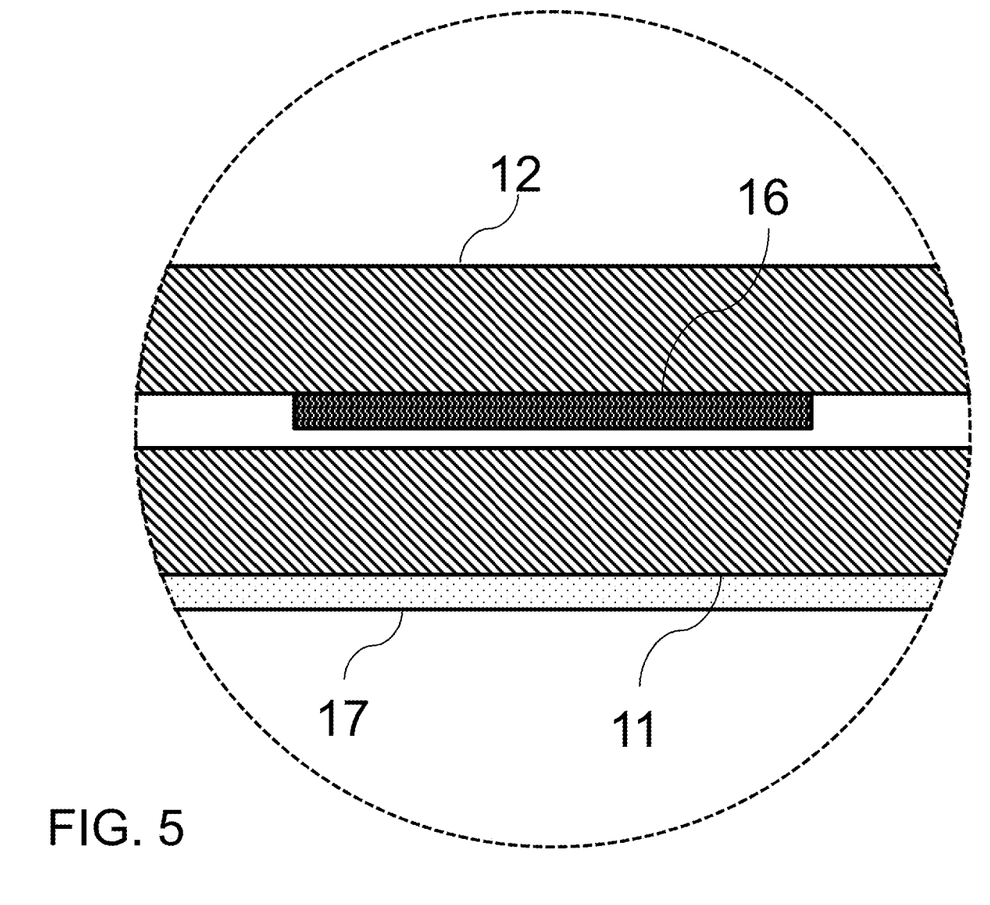
FIG. 5 is a close-up, cross-sectional view of an embodiment of the present invention, demonstrating features of a top covering and a base.

Referring now to FIG. 5, in some embodiments, a layer of non-slip material 17 may be applied to one side of the base 11. The non-slip material 17, in some embodiments, may be made using a polymerized rubber compound. In one embodiment, the non-slip material 17 completely covers the bottom side of the base. However, in other embodiments, the non-slip material 17 can be applied partially in a multitude of ways, for example, but not limited to: around the perimeter of base 11, in a grid formation, in corner patches, etc. Applications that prevent the reconfigurable pet enrichment system from sliding in some embodiments include, but are not limited to: a set of non-slip coatings, semi-permanent adhesives, suction cups, hook tape, etc. In one embodiment, the base 11 provides insulation for a pet 15. In another embodiment, the non-slip compound provides an R3 insulation rating. The base 11 can be folded and flattened without breaking.

Figure 6:
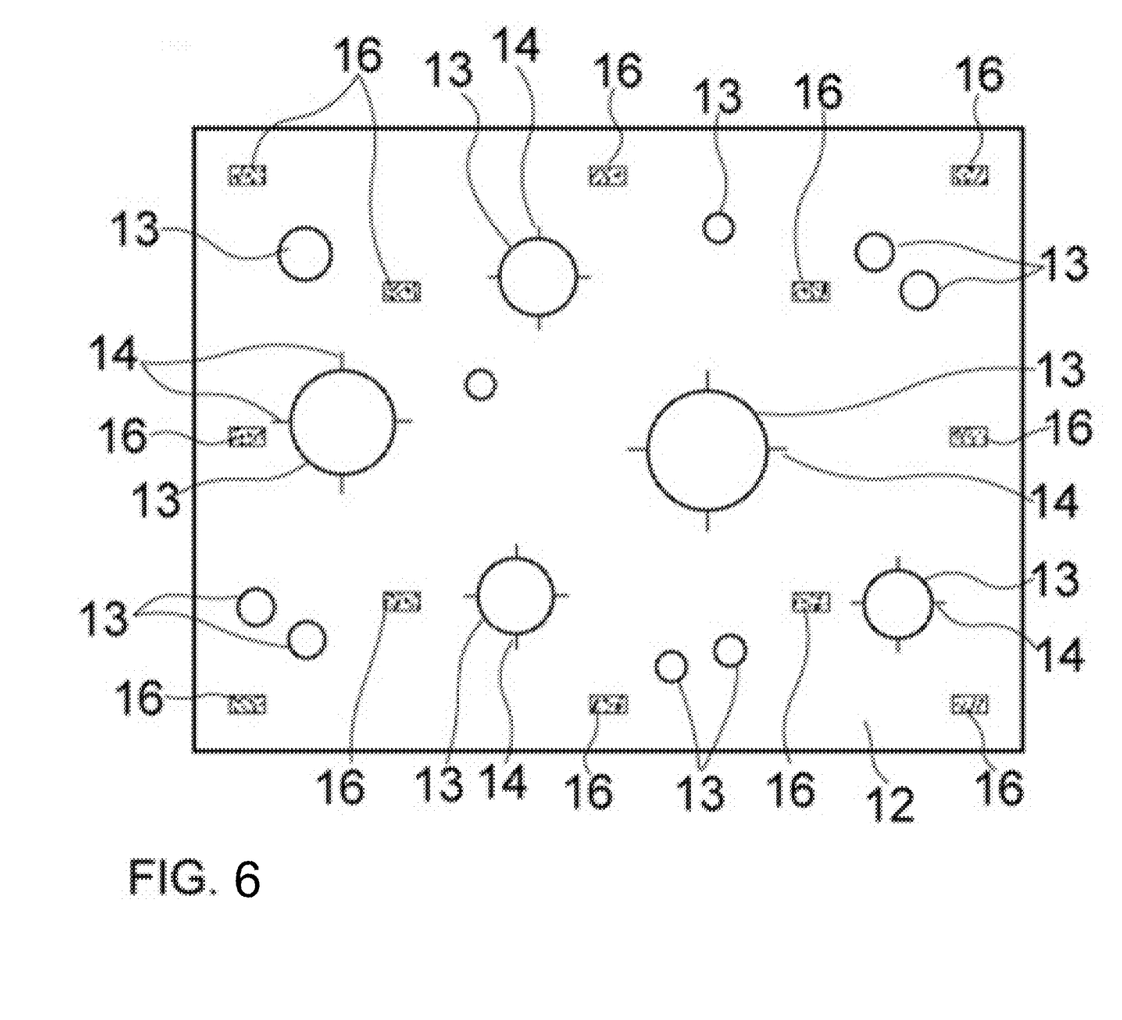
FIG. 6 is an underside of the top covering according to embodiments of the present invention.

Referring now to FIG. 6, in some embodiments, openings of various sizes may be dispersed (e.g., randomly) on the top covering 12. In one embodiment, as shown in FIG. 1, openings 13 are cut into the top covering 12. Openings 13 may vary from 1.5 to 7.0 inches, providing a pet 15 the opportunity to peer, poke, or traverse the top covering 12. In some embodiments, top covering 12 may have between 5 and 25 openings 13. In some embodiments, a number of openings 13 may be scaled with a size of the reconfigurable pet enrichment system 10. For example, while a 4 foot by 3 foot reconfigurable pet enrichment system 10 may have between 5 and 25 openings 13, a 4 foot by 6 foot reconfigurable pet enrichment system 10 may have between 10 and 50 openings 13. In still further embodiments, an opening 13 may comprise a decorative shape (e.g., a paw print), having a set of holes to form the decorative shape of the opening 13. In additional embodiments, openings 13 may be smaller than 1.5 inches or larger than 7.0 inches. With respect to the openings 13 described in the aforementioned embodiments and pictured in FIGS. 1, 2, 3, and 4, it is to be realized that the variations in opening size, frequency, and placement are illustrative examples only and not intended to be limiting.

Figure 7:
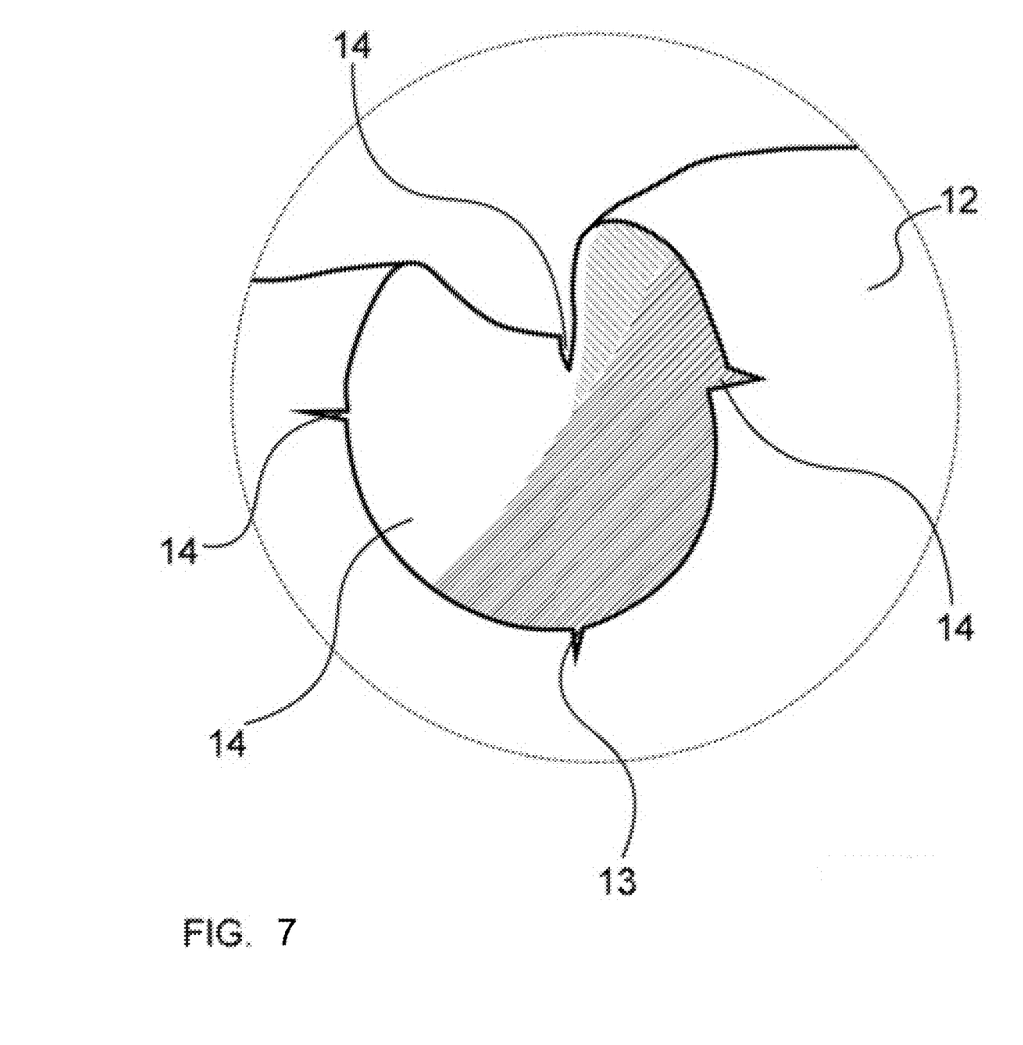
FIG. 7 is a close-up of an expansion mechanism located at a perimeter of an opening according to embodiments of the present invention.

Referring now to FIG. 7, the reconfigurable pet enrichment system 10 of the present invention may comprise expansion mechanism 14 for openings 13. FIG. 7 shows openings 13 radially cut, allowing for additional expansion and wiggle room. The embodiment demonstrated in FIG. 7 features four expansion geometries/mechanisms 14. However, the number of expansion geometries can be increased or decreased depending on the rigidness of the top covering material.

Figure 8:
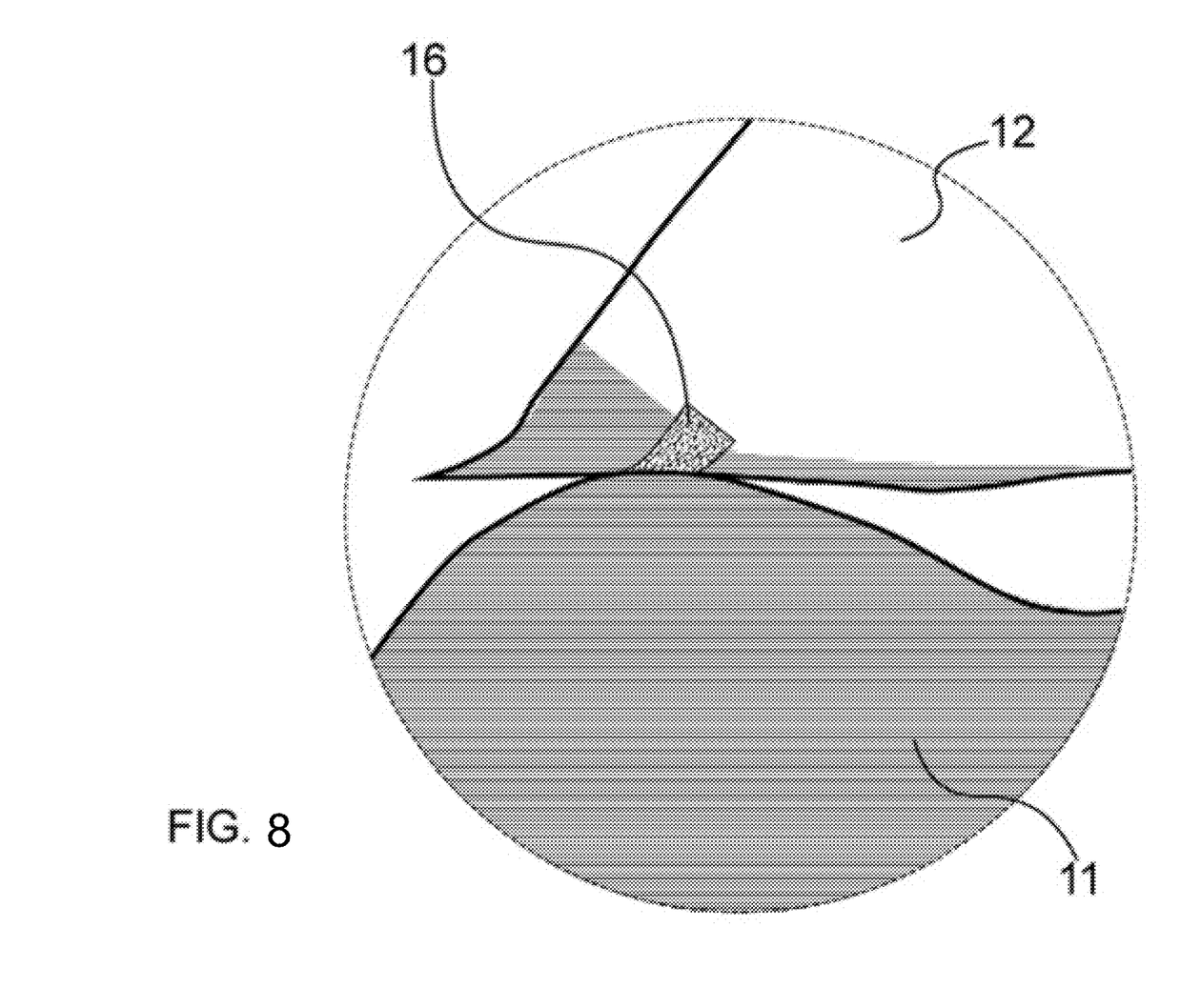
FIG. 8 is a close-up of a semi-permanent fastener, located on the underside of the top covering, and attached to the base component according to embodiments of the present invention.
Figure 8A:
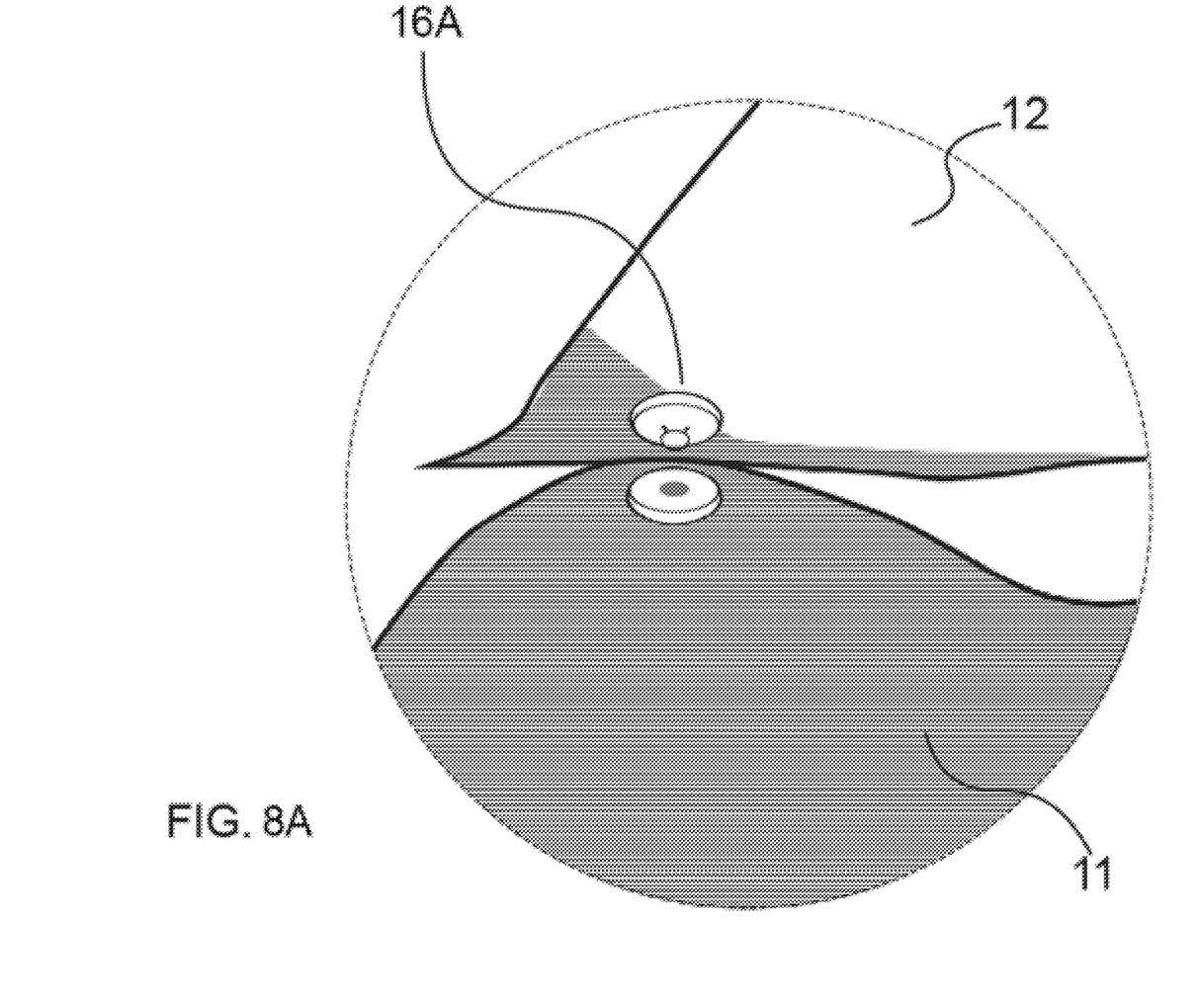
FIG. 8A is a close-up of another semi-permanent fastener, located on the underside of the top covering, and attachable to the base component according to embodiments of the present invention.

Referring now to FIG. 8, in some embodiments, the top covering 12 is attachable to the base 11 through the use of semi-permanent fasteners 16. In one embodiment, the semi-permanent fasteners 16 reside or are attached (e.g., glued, sewed, adhered) to the underside of the top covering 12 and may be used to temporarily attach the top covering 12 to the base 11. In some embodiments, top covering 12 may comprise between 5 and 20 semi-permanent fasteners 16. In some embodiments, a number of semi-permanent fasteners 16 may be scaled with a size of the reconfigurable pet enrichment system 10. For example, while a 4 foot by 3 foot reconfigurable pet enrichment system 10 may have between 5 and 20 semi-permanent fasteners 16, a 4 foot by 6 foot reconfigurable pet enrichment system 10 may have between 10 and 40 semi-permanent fasteners 16. In another embodiment, semi-permanent fasteners 16 may reside on or be attached to a top side of the top covering 12 or to a top side of the base 11. The embodiment shown in FIG. 8 demonstrates the use of hook tape as a means of fastening the top covering 12 to the base 11. For example, hook tape may be place on top covering 12 while base 11 may be made of a textile material similar to the pile/loop material of hook-and-pile/loop fasteners. When the hook tape of the top covering 12 touches the textile material of base 11, a semi-permanent attachment will be formed. In other embodiments, semi-permanent fasteners 16 such as, but not limited to, hook tape (e.g., Velcro. Velcro is a registered trademark of Velcro Ind.), semi-permanent adhesive, clips, buttons, snaps (e.g., snap fastener 16A of FIG. 8A), ties, zippers, clasps, magnets, etc., enable attachment of the top covering to any part of the base.

Semi-permanent fasteners 16 can also be used to reinforce forms of the top covering 12 of the reconfigurable pet enrichment system 10 by temporarily attaching the semi-permanent fasteners 16 not only to the base 11, but also to the top covering 12. As demonstrated in FIG. 2, an opening arch in the top covering 12 can be reinforced by folding the top covering 12 over itself, at the perimeter, and holding the fold in place using a semi-permanent fastener 16. For example, an edge of top covering 12 can be rolled onto semi-permanent fastener 16 to reinforce a form such as an arch.

In one embodiment, hook tape, serving as a semi-permanent fastener 16, may be attached to the top covering 12 by employing a sublimation technique. Sublimation bonds two materials together using a specific temperature and pressure. Hook tape may also be attached using various other methodologies such as, but not limited to, adhesive bonding, glue, hot melting, stitching, riveting, pins, etc.

In one embodiment, semi-permanent fasteners 16 may be distributed evenly (e.g., in an even pattern or in a grid pattern) on the underside of the top covering 12 to enable wide reach and coverage when attaching the top covering 12 to the base 11 via semi-permanent fasteners 16. In other embodiments, semi-permanent fasteners 16 may be distributed randomly or may initially be unattached to top covering 12 so that a pet owner user may place semi-permanent fasteners 16 where the pet owner user desires. In the illustrative embodiment shown in FIG. 6, 12 semi-permanent fasteners 16 are shown attached to the underside of the top covering 12. However, the pet enrichment system 10 may employ any plurality of semi-permanent fasteners 16. As such, additional semi-permanent fasteners 16 may be added or removed in different embodiments.

The pet enrichment system 10 can be used by a variety of companion animals/pets 15. Although a cat is shown interacting with the pet enrichment system 10 in the embodiments shown in the figures, many other companion animals/pets 15 may use the pet enrichment system 10. For example, pet enrichment system 10 may be used by a dog, a rabbit, a ferret, a hedgehog; a rodent pet such as a gerbil, a hamster, a chinchilla, a fancy rat, a prairie dog, or a guinea pig; an avian pet, such as a canary, a parakeet, or a parrot; or a reptile pet, such as a turtle, a lizard, or a snake. Furthermore, in some embodiments, scent may be applied to the base 11 and/or top covering 12. Accordingly, scents used may comply with the needs of different pets 15. For example, for a cat companion animal, a range of calming essential essences for cats such as, but not limited to, catnip, chamomile, rock rose, etc., may be encapsulated, infused, or spread into the pliable material of the top covering 12 and/or base 11. Particles of scent may then be released when touched, rubbed on, or scratched by a pet 15, for the enjoyment of the pet 15.

In further embodiments, as shown in FIG. 3, a plurality of semi-attached, easily removable members 18 may be added to the system using semi-permanent fasteners 16. For example, an assortment of members 18 such as, but not limited to, toys, scratching blocks, bells, rattles, herb-infused pouches, treat pockets, etc., may be attached to either of the base 11 or the top covering 12, at any position, at any time.

Although the description above primarily focuses on elements of a preferred embodiment, the above description should not be construed as limiting the scope of the embodiments, but rather as merely providing illustrations of some of several embodiments. For example, while the embodiments shown in FIGS. 1, 2, 3, and 4 present a quadrilateral shape for both base 11 and top covering 12, the pet enrichment system 10 is not limited to four-sided geometries. Other embodiments include a top cover 12 or base 11 having geometries such as, but not limited to, circular, elliptical, polygons, straight and/or curved, animal shapes (e.g., cat, mouse, bird), character shapes (e.g., a cartoon cat), custom shapes, etc.

In another embodiment, the pet enrichment system 10 may also comprise any pattern (e.g., plaid, floral, whimsical) or color (e.g., neutral colors such as tan, brown, beige, and white; as well as colors such as red, blue, and yellow). Variety will, for example, appeal to differing pet owners' tastes and home decors.

In yet other embodiments, the size of pet enrichment system 10, including both the base 11 and the top covering 12, may vary. In one embodiment, pet enrichment system 10 may measure about 47 inches by 35 inches or about 4 feet by 3 feet; however, pet enrichment system 10 may be embodied as smaller versions to larger deluxe sized versions. Smaller versions will appeal to owners with smaller pets (e.g., rats, ferrets, prairie dogs, rabbits, etc.). Whereas, larger sized pet enrichment systems 10 will appeal to owners with larger or more than one pet (e.g., multiple cats or a small dog, etc.).

Operation:

The top covering 12 can be temporarily attached to the base 11 via the semi-permanent fasteners 16, which in some embodiments reside on an underside of top covering 12. The reconfigurable pet enrichment system 10 is characterized by the system's ability to be reshaped, reconfigured, and altered in form, thereby serving a plurality of differing pet needs. The reconfigurable pet enrichment system 10 addresses needs of pets 15, such as, but not limited to: stimulation, exercise, entertainment, grooming, a predatory play space, an environment allowing positive human interaction, and a secure, safe space in which to rest and recover.

Figure 10:
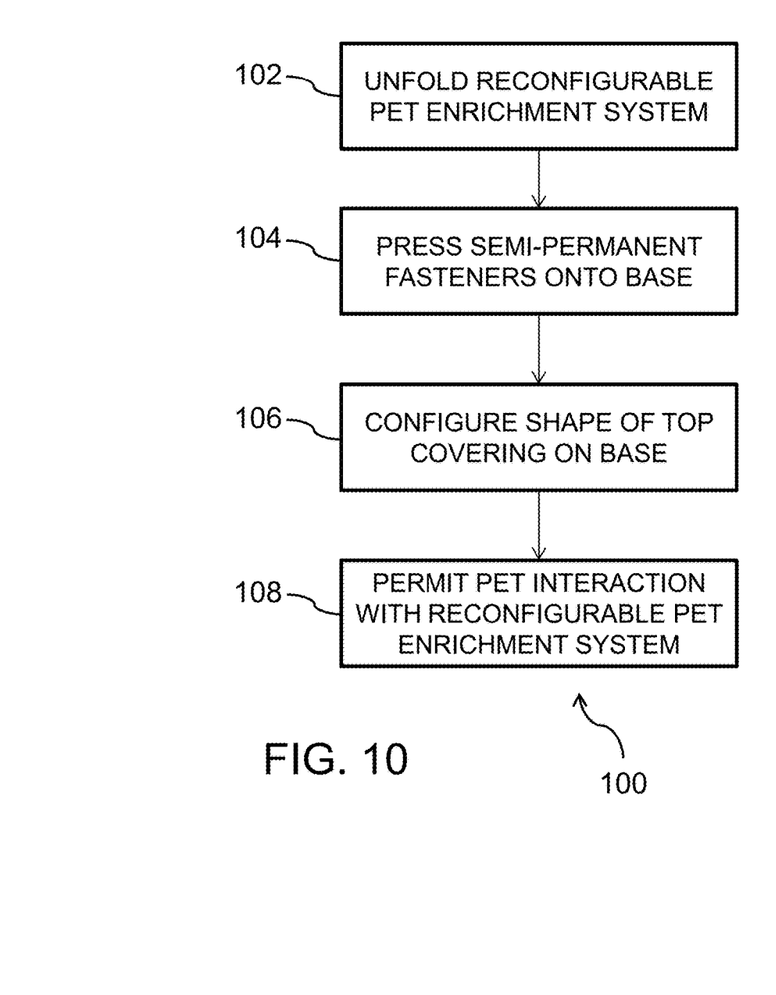
FIG. 10 shows a process flowchart for assembling a reconfigurable pet enrichment system according to embodiments of the present invention.

Referring now to FIG. 10, a process flowchart 100 for assembling the reconfigurable pet enrichment system 10 is shown. At 102, a pet owner unfolds reconfigurable pet enrichment system 10 in preparation for configuration. At 104, the pet owner presses the semi-permanent fasteners 16 onto the base 11 in desired configurations and locations to form ripples, nooks, or tunnels (e.g., as seen in FIGS. 1, 2, 3, and 4). At 106, the owner configures a shape of reconfigurable pet enrichment system 10 as desired. Reconfigurable pet enrichment system 10 does not have any specific configurations. The owner can create new configurations as often as he/she likes. When an owner creates new configurations, the interests of pets 15 are instinctively aroused, prompting interaction of pet 15 with reconfigurable pet enrichment system 10 at 108. Pets 15 are continually intrigued by different formations. Interest of pets 15 is captured through continued variation, thereby nurturing the need for stimulation, through variety and change.

FIG. 1 shows an example configuration of the reconfigurable pet enrichment system 10. In this example, the reconfigurable pet enrichment system 10 is configured with tunnels in which a companion animal/pet 15 can hide, observe, and pounce to and from, allowing the pet 15 to exercise predatory instincts.

Moreover, pets greatly enjoy interaction with others, including owners and other pets. The reconfigurable pet enrichment system 10 provides a place where pets 15 can hide inside a ripple, a nook, or an owner-generated tunnel while the owner or another pet interacts with the pet 15 through the top covering 12 and openings 13 of varying sizes, thereby entertaining both pets and owner.

Once ripples and undulations have been formed in the top covering 12 by the owner, pets 15 enjoy nestling in the resulting shapes. The top covering 12 shaped ripples, can cradle the body of the pet 15, as the pet, for example, stretches out or curls up. The reconfigurable pet enrichment system 10 provides a place where pets 15 feel safe and can sleep, rest, and relax in their own defensible territory. The pet enrichment system is a viable bed, offering the pet the option of sleeping under the top covering component 12 or resting directly on top.

Many pets, cats in particular, instinctively mark their territory by stretching, rubbing and scratching, as shown by pet 15 in FIG. 2. Many pet owners become distressed when cats and other pets scent-mark furniture, for example armchairs, rugs etc., by rubbing their scent glands from their head and paws against the furniture, followed by a nail scratch. To redirect this behavior, the reconfigurable pet enrichment system 10, with its varied forms/configurations, provides pet 15 with amble surface area to scratch, groom on, dig at, and rub with fur.

For many owners, the pet enrichment system 10 also offers a safe play space for younger pets (e.g., kittens, puppies) to act out their natural instincts through play. The changing ripples and shapes (created by an owner as he/she reconfigures the top covering 12) both challenge and stimulate healthy pet behaviors, ultimately preventing unwanted and destructive behaviors.

Referring now back to FIG. 3, an owner may attach additional members 18 to the pet enrichment system 10, for example, but not limited to, toys, scratching blocks, herb-based pouches, fake toy mice, etc. In some embodiments, additional members 18 may be constructed with semi-permanent fasteners (e.g., hook tape), and can be attached to the pet enrichment system 10, allowing a pet 15 to rip, tear, attack, hunt, and prod the additional members 18. This creates further intrigue from a pet and entices the pet to play and interact with the pet enrichment system 10.

Figure 9:
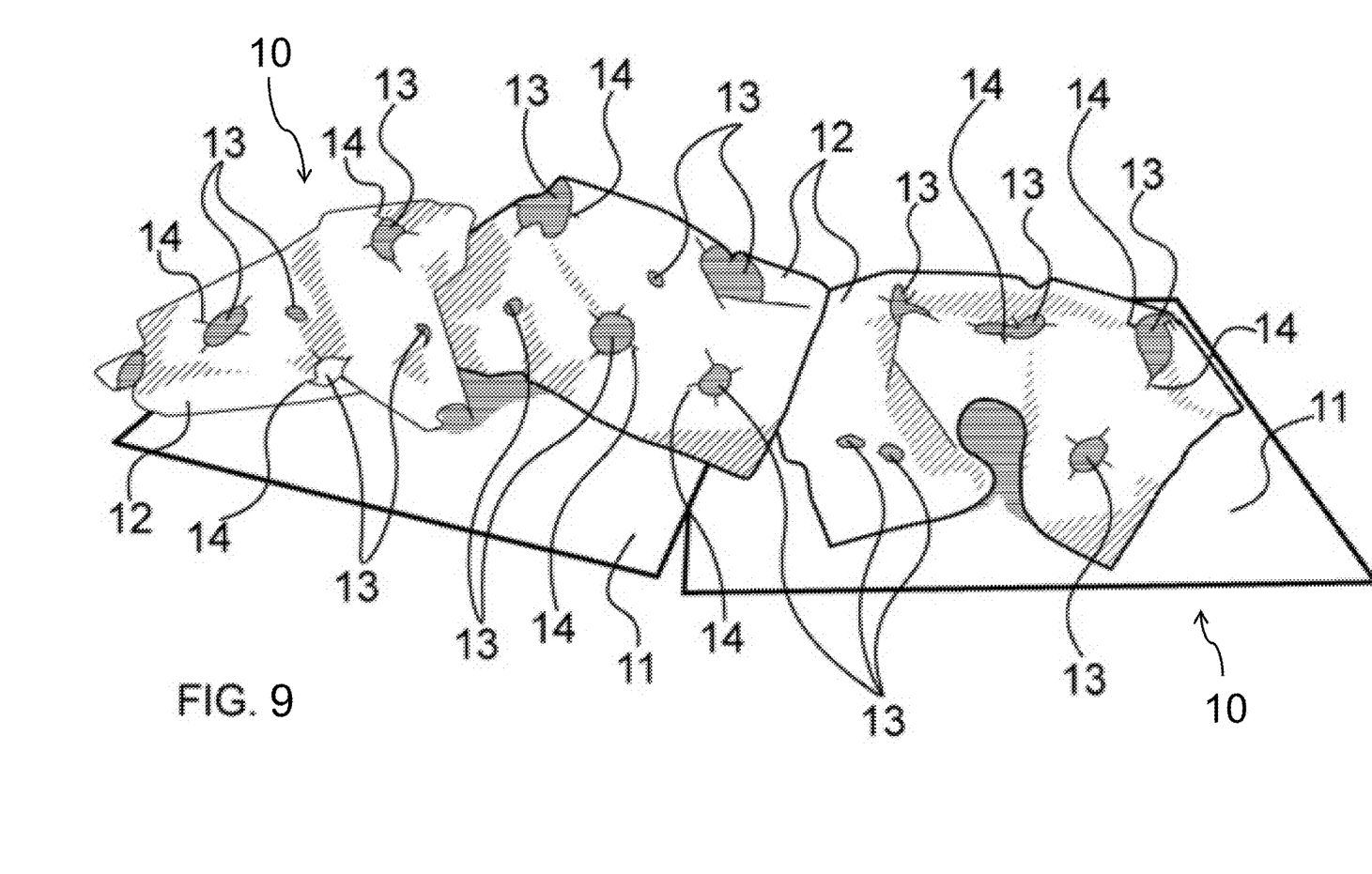
FIG. 9 is a side view demonstrating a modular nature of the system of the present invention, showing an embodiment comprised of two base components and three top coverings.

Referring now to FIG. 9, a plurality of reconfigurable pet enrichment systems 10 may be used together in some embodiments. For example, a conglomerate system may be formed from a plurality of base components 11 and a plurality of top coverings 12, if desired. The semi-permanent fasteners 16 allow for modular expansion and attachment of more than one component.

In another embodiment, the top covering 12 may be used in conjunction with existing pet furniture. This not only provides a new and exciting environment, but it also creates renewed interest in previously abandoned pet toys and furniture. The semi-permanent fasteners 16 may be used, for example, to attach the top covering 12 to and/or around furniture, such as to a cat tree, allowing for new structures, such as defensive play-spaces and sleeping areas.

Figure 11:
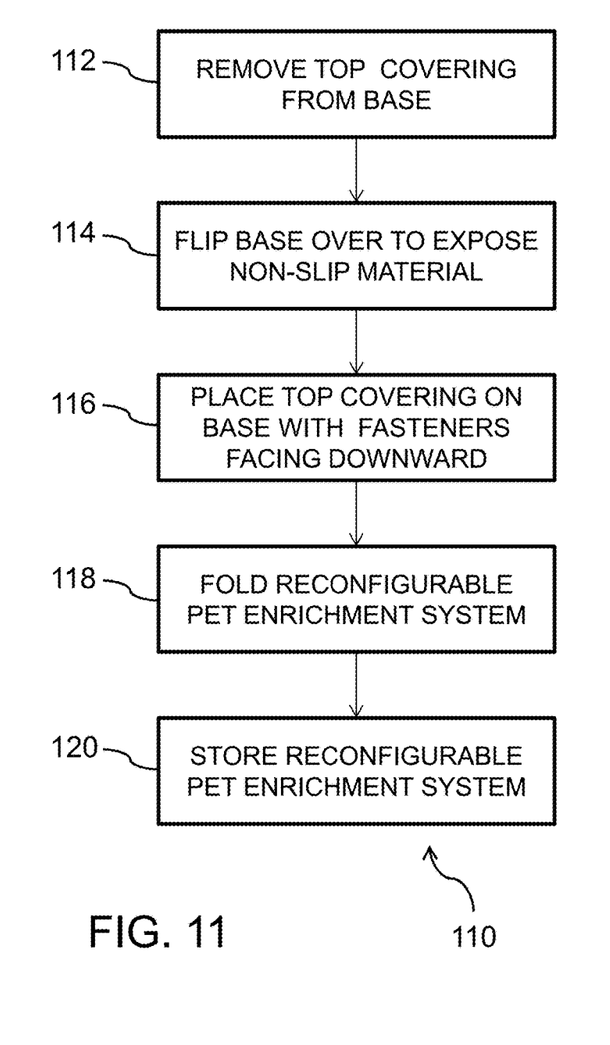
FIG. 11 shows a process for compacting a reconfigurable pet enrichment system according to embodiments of the present invention.

Referring now to FIG. 11, the reconfigurable pet enrichment system 10 may also be folded and/or stored. As some embodiments of the reconfigurable pet enrichment system 10 are comprised of a pliable textile material, such as a needle-punch polyester carpet, base 11 and top covering 12 may be folded flat and placed in a storage container, such as a plastic bag or on a storage shelf. A process 110 for folding and/or storing the reconfigurable pet enrichment system 10 is described in FIG. 11. Firstly, at 112, the top covering 12 is removed from base 11. Then, at 114, base 11 is flipped over to expose the layer of non-slip material 17. Next, at 116 top covering 12, is placed on top of the base 11, with the semi-permanent fasteners 16 facing downward. This prevents the semi-permanent fasteners 16 from attaching to base 11 during storage and being placed under stress during folding. The reconfigurable pet enrichment system 10 may then be folded at 118, for example three or four times, to form a compact unit for storage at 120.

When shipping the reconfigurable pet enrichment system 10 from a manufacturing source or when storing the pet enrichment system 10 in a retailer's facility, the pet enrichment system 10 can be folded into a compact geometry as described above. A compactly folded reconfigurable pet enrichment system 10 can also be moved easily to different locations. For example, with respect to transportation and storage of the reconfigurable pet enrichment system 10, the folded system will occupy less space and result in lighter-weight shipping costs.

The reconfigurable pet enrichment system of the present invention has been shown, described, and illustrated in substantial detail with reference to working embodiments. It will be understood by those skilled in this art that other and further changes and modifications may be made without departing from the spirit and scope of the present invention, which is defined by the claims appended hereto.

What is claimed is:

1. A method of providing a pet enrichment system comprising a base and a top covering having a plurality of semi-permanent fasteners affixed on a lower surface of the top covering and at least three openings in the top covering, the method comprising:

selecting a pliable continuous landscape of a plurality of three-dimensional local maximums and local minimums operating in a three-dimensional space into which to configure the top covering when the top covering is attached by at least a first subset of the plurality of semi-permanent fasteners and a second subset of the plurality of semi-permanent fasteners to an upper surface of the base, the selected pliable continuous landscape of the plurality of three-dimensional local maximums and local minimums being further configured to form an internal cavity accessible through at least one of the openings located between the first subset of the plurality of semi-permanent fasteners and the second subset of the plurality of semi-permanent fasteners on the top covering, wherein the internal cavity has space suitable for containing a companion animal and the at least one of the openings is of sufficient size to permit the animal to pass through the opening into the internal cavity;

attaching the first subset of the plurality of semi-permanent fasteners to a first set of locations on the upper surface of the base associated with the selected pliable continuous landscape of the plurality of three-dimensional local maximums and local minimums, wherein the semi-permanent fasteners are configured to each be coupled interchangeably to any of a plurality of locations on the upper surface of the base;

shaping the top covering into the selected pliable continuous landscape of the plurality of three-dimensional local maximums and local minimums operating in the three-dimensional space, the three-dimensional local maximums and local minimums of the top covering providing a plurality of areas suitable for the companion animal be situated; and attaching the second subset of the plurality of semi-permanent fasteners to a second set of locations on the upper surface of the base associated with the selected pliable continuous landscape of the plurality of three-dimensional local maximums and local minimums, wherein the attachment of the first and second subset of the plurality of semi-permanent fasteners on the upper surface of the base permits the internal cavity to be self-standing, wherein at least one fastener of the plurality of fasteners is attached to the upper surface of the base at a local minimum between two local maximums of the plurality of three-dimensional local maximums and local minimums.

2. The method of providing a pet enrichment system of claim 1, the method further comprising separating the first and second subsets of the plurality of semi-permanent fasteners from the first and second sets of locations on the upper surface of the base.

3. The method of providing a pet enrichment system of claim 2, the method further comprising:

selecting a pliable continuous second landscape of a second plurality of three-dimensional local maximums and local minimums operating in the three-dimensional space into which to configure the top covering;

attaching a third subset of the plurality of semi-permanent fasteners to a third set of locations on an upper surface of the base associated with the selected second landscape of the second plurality of three-dimensional local maximums and local minimums;

shaping the top covering into the selected pliable continuous second landscape of the second plurality of three-dimensional local maximums and local minimums operating in the three-dimensional space; and attaching a fourth subset of the plurality of semi-permanent fasteners to a fourth set of locations on the upper surface of the base associated with the selected second landscape of the second plurality of three-dimensional local maximums and local minimums.

4. The method of providing a pet enrichment system of claim 1, the method further comprising permitting an animal to interact with the top covering and base in the selected pliable continuous landscape of the plurality of three-dimensional local maximums and local minimums operating in the three-dimensional space.

5. The method of providing a pet enrichment system of claim 1, wherein at least one of the plurality of semi-permanent fasteners is a snap fastener.

6. The method of providing a pet enrichment system of claim 1, wherein at least one of the plurality of semi-permanent fasteners is a hook tape fastener.

7. The method of providing a pet enrichment system of claim 1, wherein at least one of the plurality fasteners is affixed on the lower surface of the top covering between two of the at least three openings.

8. The method of providing a pet enrichment system of claim 7, wherein some of the plurality of fasteners are distributed on the lower surface of the top covering around a perimeter of the top covering and some of the plurality fasteners are affixed on the lower surface of the top covering in each corner of the top covering.

9. The method of providing a pet enrichment system of claim 1, the method further comprising storing the pet enrichment system by:
separating the top covering from the base;
positioning the base to expose an underside of the base;
placing the top covering over the underside of the base with the set of semi-permanent fasteners faced towards the underside of the base; and
folding or rolling the top cover and base together.

10. The method of providing a pet enrichment system of claim 1, wherein the top covering and the base comprise a reshapable, pliable material.

11. The method of providing a pet enrichment system of claim 10, wherein the reshapable, pliable material is a carpet material.

12. The method of providing a pet enrichment system of claim 10, wherein the reshapable, pliable material does not break and substantially does not deform when folded.

13. The method of providing a pet enrichment system of claim 1, the method further comprising attaching an article to the pet enrichment system, the article selected from the group consisting of: an interactive play member, a second top covering, a second base, and an item of furniture.

14. The method of providing a pet enrichment system of claim 1, wherein each of the plurality of semi-permanent fasteners is configured to couple to a first material, wherein the upper surface of the base is made substantially of the first material, and wherein the lower surface of the top covering is made substantially of a second material that does not attach on touch to the first material.

15. The method of providing a pet enrichment system of claim 14, wherein each of the plurality of semi-permanent fasteners is configured to not couple to the second material.

16. The method of providing a pet enrichment system of claim 14, wherein each of the plurality of semi-permanent fasteners is configured to couple to a third material and wherein the upper surface of the top covering is made substantially of the third material.

17. The method of providing a pet enrichment system of claim 1, wherein the method further comprises attaching a third subset of the plurality of semi-permanent fasteners to a set of locations on an upper surface of the top covering, wherein the semi-permanent fasteners are each configured to be coupled to any of a plurality of locations on the upper surface of the top covering.

18. The method of providing a pet enrichment system of claim 17, wherein the method further comprises forming a reinforced arch along a side of the top covering by folding an edge of the top covering under the top covering and securing the edge with a fastener of the plurality of semi-permanent fasteners.

19. The method of providing a pet enrichment system of claim 17, wherein each of the plurality of semi-permanent fasteners is configured to couple to a first material, wherein the upper surface of the top covering and the upper surface of the base are made substantially of the first material, and wherein the lower surface of the top covering is made substantially of a second material that does not attach on touch to the first material.

20. The method of providing a pet enrichment system of claim 1, wherein the internal cavity is bounded by material of the base on a base side of the internal cavity and substantially surrounded by material of the top covering around all other sides of the internal cavity.

* * * * *